(12) United States Patent
Gaussin

(10) Patent No.: US 12,233,741 B2
(45) Date of Patent: Feb. 25, 2025

(54) VEHICLE FOR CONTAINER TRANSPORT WITH ELECTRIC MOTOR AND BATTERY

(71) Applicant: MILESTONE FACTORY SA, Lausanne (CH)

(72) Inventor: Christophe Gaussin, Gandvaux (CH)

(73) Assignee: Milestone Factory SA, Lausanne (CH)

( * ) Notice: Subject to any disclaimer, the term of this patent is extended or adjusted under 35 U.S.C. 154(b) by 49 days.

(21) Appl. No.: 17/254,502

(22) PCT Filed: Jun. 21, 2019

(86) PCT No.: PCT/EP2019/066442
§ 371 (c)(1),
(2) Date: Dec. 21, 2020

(87) PCT Pub. No.: WO2019/243560
PCT Pub. Date: Dec. 26, 2019

(65) Prior Publication Data
US 2021/0122262 A1    Apr. 29, 2021

(30) Foreign Application Priority Data

Jun. 22, 2018 (FR) ...................................... 18 55611

(51) Int. Cl.
*B60L 53/80* (2019.01)
*B60K 1/04* (2019.01)

(52) U.S. Cl.
CPC ................ *B60L 53/80* (2019.02); *B60K 1/04* (2013.01); *B60K 2001/0438* (2013.01);
(Continued)

(58) Field of Classification Search
CPC .... B60K 2001/0444; B60K 2001/0461; B60K 2001/0494; B60L 53/80; B60L 2200/28; B60L 2200/36
See application file for complete search history.

(56) References Cited

U.S. PATENT DOCUMENTS

| 2010/0114762 | A1* | 5/2010 | Ishii | ...................... | H02J 7/0027 |
| | | | | | 705/40 |
| 2012/0299531 | A1 | 11/2012 | Prosser et al. | | |

(Continued)

FOREIGN PATENT DOCUMENTS

| CN | 107215194 A | * | 9/2017 |
| CN | 107284216 A | * | 10/2017 |

(Continued)

OTHER PUBLICATIONS

Shang Jack, "Our lithium battery for electric bus", May 5, 2013 (May 5, 2013), p. 1-2, URL:https://www.youtube.com/watch?v=RpVZjq7i-gk.

(Continued)

*Primary Examiner* — Katy M Ebner
(74) *Attorney, Agent, or Firm* — Craft Chu PLLC; Andrew W. Chu

(57) ABSTRACT

The vehicle for container transport includes a chassis mounted on top of a rolling device and at least one housing of a battery for a self-contained electric power supply of an electric motor for driving all or part of the rolling device. There is a housing defined as a recess extending from at least one of the sides of the chassis and including a device for lateral insertion and support of at least one battery module and a device for electrical interconnection with the module. The device for insertion and support includes, at the bottom of the recess, a support base on which at least one battery module, or even a plurality of these modules, can rest. Advantageously, at the height of the support base, on the periphery and inside a recess, abutment flanges are provided to ensure that at least one battery module is immobilized transversely and longitudinally.

7 Claims, 1 Drawing Sheet

(52) U.S. Cl.
CPC ... *B60K 2001/0461* (2013.01); *B60L 2200/36* (2013.01); *B60Y 2200/14* (2013.01)

(56) References Cited

U.S. PATENT DOCUMENTS

| | | |
|---|---|---|
| 2015/0207130 A1 | 7/2015 | Maguire et al. |
| 2018/0056769 A1* | 3/2018 | Kerspe .................... B60L 50/64 |
| 2018/0162447 A1* | 6/2018 | Fees ...................... B62D 21/155 |
| 2019/0291560 A1* | 9/2019 | Lampsa .................. B60K 1/04 |

FOREIGN PATENT DOCUMENTS

| | | | | |
|---|---|---|---|---|
| DE | 102012014376 A1 * | 1/2013 | .............. | B60K 1/04 |
| DE | 102012108769 A1 * | 3/2014 | .............. | B60K 1/04 |
| DE | 102014013117 A1 | 10/2015 | | |
| DE | 102015119193 A1 | 5/2017 | | |
| DE | 102015119759 A1 * | 5/2017 | | |
| DE | 102016222779 A1 * | 5/2018 | | |
| WO | WO-2010142687 A1 * | 12/2010 | .............. | B60K 1/04 |
| WO | WO-2013178089 A1 * | 12/2013 | .............. | B60K 1/04 |
| WO | WO-2017076980 A1 * | 5/2017 | .............. | A62C 27/00 |

OTHER PUBLICATIONS

Zhuo Jia, "EV using battery swap at 2008 Olympic Games", Apr. 19, 2012 (Apr. 19, 2012), p. 1-2, URL:https://www.youtube.com/watch?v=9lv0_InLWGU.

* cited by examiner

VEHICLE FOR CONTAINER TRANSPORT WITH ELECTRIC MOTOR AND BATTERY

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The invention relates to a vehicle for container transport comprising a chassis on top of rolling means and comprising at least one accommodation for a battery for self-contained electrical energy supply to electric motor means for driving all or part of said rolling means, said accommodation being defined in the form of a recess extending from at least one of the lateral sides of the chassis and including means for lateral insertion and support of at least one battery module, as well as means for electrical interconnection with said module, said means for insertion and support including, in the lower portion of the recess, a support base on which at least one battery module, even several of these modules, can rest.

The present invention is related to the field of the vehicles for container transport, more particularly for use at the level of areas of transshipment of these containers, such as in port, airport areas or freight railway stations.

2. Description of Related Art Including Information Disclosed Under 37 CFR 1.97 and 37 CFR 1.98

Such vehicles comprise a chassis on top of rolling means, which may partially be of the orientable type.

As the case may be, they may be in the form of a towing vehicle, which a trailer can be attached to, which in turn comprises rolling means, this trailer being topped by a platform for loading at least one container.

Also known are vehicles the chassis of which is directly topped by a platform for loading at least one container, so that there is no distinction between tractor and trailer.

It is furthermore common practice to associate a control unit with the chassis, for example in the form of a cabin capable of accommodating an operator-driver.

It has become increasingly common to equip such vehicles for container transport with electric motor means. In this case, they integrate self-contained energy supply means in the form of a battery taking place in a suitable accommodation at the level of the chassis.

The problem raised by such electric motor vehicles lies in their downtime for recharging these batteries.

Though this recharging is usually scheduled so that it occurs during the quiet phases in the daily transshipment schedules, i.e. when these vehicles are used in a smaller number, their autonomy, even a busy schedule without a real drop in frequency does not systematically permit to ensure this recharging of the batteries during idle time. Therefore, it is often necessary to have a sufficient fleet of electric vehicles, even larger compared to the number of thermal engine vehicles, which should be available in order to ensure the same transshipment rates.

One of the solutions that have been adopted to address this issue of battery recharging time has, until now, consisted in increasing the autonomy of the vehicles for container transport by adding additional batteries. However, such a solution has the drawback of significantly increasing the weight of the vehicle itself, often while reducing its payload.

Another solution consisted in using fast battery chargers, which of course reduce these recharging times without however avoiding them, not to mention that this fast recharging of the batteries can have an impact on the longevity of the latter, in particular in extreme weather conditions.

It is known to provide these batteries or no interchangeable batteries.

In particular, from EP 2 440 431 is known an unmanned electric vehicle for container transport including a chassis topped by a loading platform and resting on least adapted movements. Under this loading platform is provided, at the level of the chassis, a space for receiving a battery pack. More particularly, under the loading platform, the chassis includes two slides extending transversely. The battery is laterally inserted onto these slides through suitable handling means. This insertion through a linear movement transversely to the vehicle obliges to equip the chassis with means for blocking the battery in movement, in order to avoid any risk of accident during the displacements of the vehicle. Obviously, the operators must absolutely remember to activate these locking means after inserting a battery at the level of the chassis, not to mention that it is also necessary to make these locking means inoperative before attempting to remove a battery from a vehicle. The binding nature of these various manipulations may prove to be the source of the risk of an accident.

From DE 2015 10119193 is also known a vehicle for container transport, the chassis of which, here too, includes between the rolling means a suitable accommodation for receiving a battery. Though it is presented laterally to the chassis of the vehicle, it is deposited in its adapted accommodation at the level of this chassis by a vertical movement in order to cooperate with suitable hooking and connecting means. This configuration almost requires the absence of loading on this transport vehicle for the installation of the battery. In addition, in order to ensure such an interlocking and interconnection, this vertical movement must be of sufficient amplitude and therefore important, hence the general bulkiness and an impact on the size of the elements.

BRIEF SUMMARY OF THE INVENTION

Within the framework of an inventive step we have devised a solution permitting to provide a vehicle for transporting an electric container with a maximum autonomy in a period of time substantially equivalent to the one necessary for refueling a vehicle with a thermal engine and this with great ease, namely by implementing traditional handling means, such as a pallet lifter. This solution is also intended to be practical by avoiding essential handlings in order to guarantee the secure immobilization of the battery on the vehicle.

Within this context we thought, not to recharge the batteries, but to replace them with others that are already charged.

Continuing with this inventive approach, we have imagined that this replacement of the batteries could take place under all conditions, and in particular with the loaded vehicle, i.e. transporting one or more containers. In this same step, a solution has been devised to guarantee the immobility of the battery or batteries regardless of the actuation of independent locking or blocking means.

Thus, the invention relates to a vehicle for container transport comprising a chassis on top of the rolling means and comprising at least one accommodation for a battery for self-contained electrical energy supply to electric motor means for driving all or part of said rolling means, said accommodation being defined in the form of a recess extending from at least one of the lateral sides of the chassis and including means for lateral insertion and support of at least one battery module, as well as means for electrical interconnection with said module, said means for insertion and support including, in the lower portion of the recess, a support base on which at least one battery module, even several of these modules, can rest, wherein at the level of the base, on the periphery and inside a recess, are provided abutment flanges in order to immobilize in translation and longitudinally at least one battery module.

According to a peculiarity of the invention, under the chassis of the transport vehicle, in front of a recess for the accommodation of a battery module, is provided a passing-through opening for receiving such a battery module by means of an appropriate handling device, for example the forks of a pallet-lifting device.

The advantages resulting from the present invention consist in that the replacement of a battery module, even of several battery modules equipping a transport vehicle according to the invention, is carried out with great ease, without the unloading of said vehicle being required.

Indeed, through the possible use of a traditional lifting device, but also thanks to suitable interconnection means, a battery module can easily be removed from said transport vehicle, this in a record time.

In brief, thanks to the invention, the fleet of electric vehicles for container transport required at a container transshipment site no longer depends on the period of time for recharging the batteries of these vehicles, not even on their autonomy. Indeed, these transport vehicles can be used almost permanently, except when replacing their battery module, which operation is not more, even less, time-consuming than the refueling of an equivalent vehicle for container transport equipped with thermal engine means.

Further aims and advantages of the present invention will become evident from the following description relating to exemplary embodiments.

The understanding of this description will be facilitated when referring to the attached drawings.

DETAILED DESCRIPTION OF THE INVENTION

Figure 1:
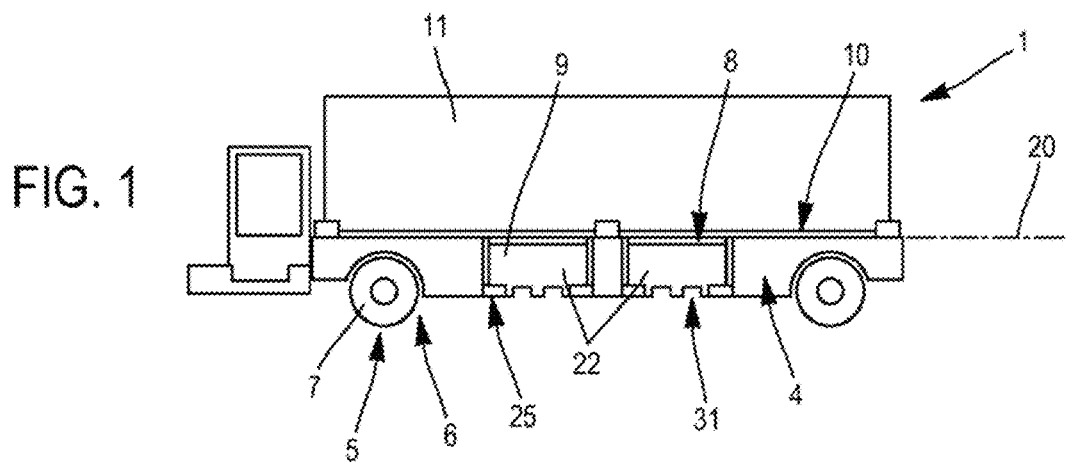
FIG. 1 is a schematic view of a representation of a first embodiment of a vehicle for container transport according to the invention.
Figure 2:
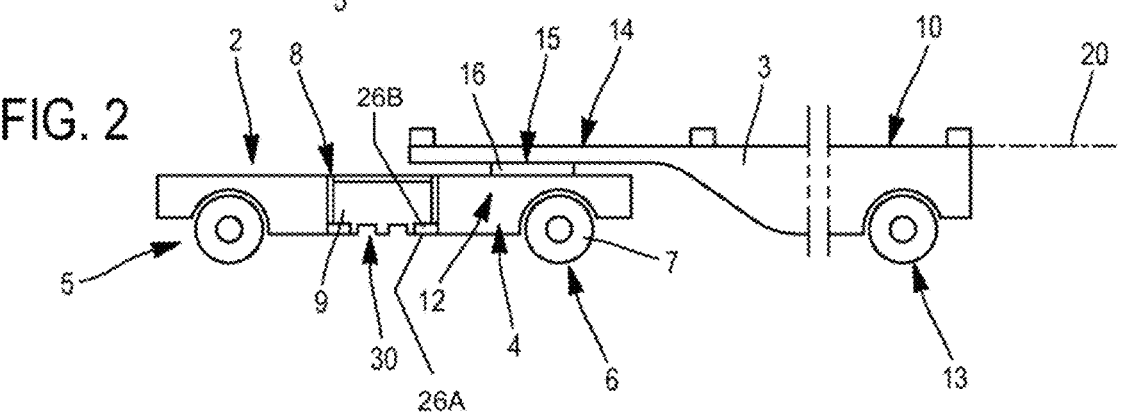
FIG. 2 is a schematic view of an illustration similar to FIG. 1 showing such a vehicle for container transport including a towing vehicle according to the invention.
Figure 3:
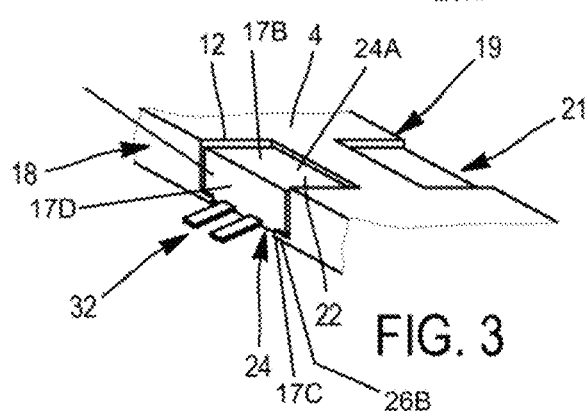
FIGS. 3, 4 and 5 show schematic views of the principle of removing and receiving a battery module by means of a lifting device such as a pallet lifter.
Figure 4:
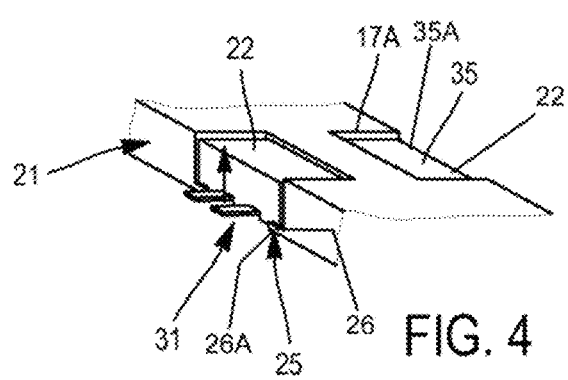
Figures 5, 6:
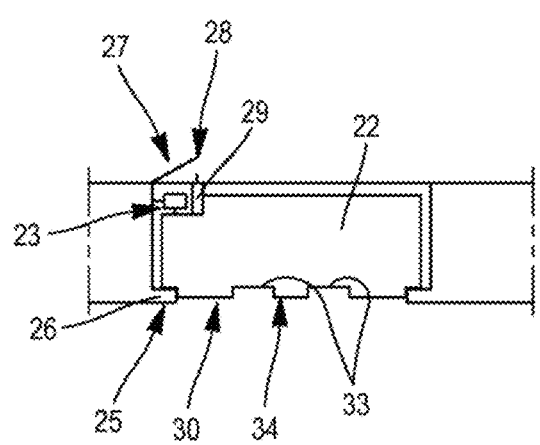
FIG. 6 is a partial schematic view of a representation showing the accommodation of a battery module in the recess provided at the level of the chassis of the vehicle, whereby the means of interconnection of this battery module with said vehicle are shown schematically.

As can be seen in FIGS. 1 and 2 of the attached drawing, the present invention relates to a vehicle for containers transport 1, which can be understood in the form of a vehicle 1 capable of transporting at least one container as schematically shown in FIG. 1 or of a towing vehicle 2, which a trailer 3 can be attached to, which is more particularly intended to support at least one such container.

The aim to be achieved is the same in both cases, as will become evident in the following description.

Thus, such a transport vehicle 1; 2 comprises a chassis 4 on top of rolling means 5 driven by electric motor means 6, for example integrated entirely or partially in the wheels 7 of the rolling means 5, without the present invention being limited to such an embodiment. This vehicle 1; 2 also includes at least one accommodation 8 of batteries 9 for self-contained electrical energy supply to the electric motor means 6.

Within the framework of a vehicle for container transport 1 as shown in FIG. 1, its chassis 4 is directly topped by a loading platform 10 on which at least one container 11 can rest, while being maintained.

In the case of a towing vehicle 2, at least partially above the chassis 4 extends such a loading platform 10 associated with the trailer 3. Though, in its rear portion 12, this trailer 3 itself rests on rolling means 13, which are specific to same, in its front portion 14 extending above the chassis 4 of the towing vehicle 2, this trailer 3 includes means for cooperating 15 with towing means 16, which the towing vehicle 2 is provided with.

The accommodation 8, in which the batteries 9 having at least one battery module 22 for power supply to the electric motor means 6 are positioned, is defined in the form of a recess 17, 17A (recess 17 having an upper recess portion 17B with an upper opening 24A, a lower recess portion 17C, 30, and a side recess portion 17D with a side opening 24, a second recess 17A) extending from at least one of the lateral sides 18, 19 (at least one lateral side 18, another lateral side 19) of the chassis 4, as the case may be, of the vehicle 1; 2, under the plane 20 defined by the loading platform 10.

This recess 17 also includes means 21 for lateral insertion and for support of said at least one battery module 22.

Advantageously, the recess 17 is also equipped with means for electrical interconnection 23 with said battery module 22.

Substantially, the means 21 for lateral insertion and support are formed by at least one opening or side opening 24 for access to this recess 17, laterally to the chassis 4, which side opening 24 is located under the plane 20 and has dimensions adjusted to those 25 of at least one battery module 22 in order to allow its passing through and its placing in this recess 17.

In particular, this side opening 24 can be defined larger in order to receive several battery modules 22 arranged side by side in such a recess 17.

In particular, the means 21 for lateral insertion and support also include a support base 25 in the lower portion 17C, 30 of this recess 17, on which base 25 such a battery module 22, even several of these modules, can rest.

At the periphery of and inside this recess 17, at the height of the support base 25 are provided abutment flanges 26 having a lower portion 26A extending from a periphery of the lower recess portion 17C of the recess and inside the lower recess portion 17C of the recess and a side portion 26B extending from a periphery of the side recess portion 17D of the recess and inside the side recess portion 17D of the recess capable of ensuring the immobilization transversely and longitudinally of at least one battery module 22 relative to the chassis 4.

In a complementary manner, additional securing means can be provided in order to guarantee this maintaining in position of a battery module in this recess 17. Such means can adopt different forms of embodiment, such as immobilization studs, hook, toggle closure system, or the like.

As regards the interconnection means 23, they can adopt the form of electrical connectors meeting the appropriate safety standards.

In this regard and in a manner particular to the invention, the vehicle 1; 2 advantageously includes electrical safety cut-off means 27 intended to ensure the cutting-off of the power supply to a battery module 22 before its disconnection. As an exemplary embodiment, such electrical safety cut-off means 27 may be in the form of an access shutter 28 to the interconnection means 23. This shutter 28 may be in cooperation with electrical cut-off means 29 associated with a battery module 2, upstream of the interconnection means 23 in order to generate, by opening the access shutter 28, this cutting-off of the electric power to said battery module 22.

In brief, through this safety means is avoided any risk of an electric arc and electrocution when the operator disconnects a battery module 22 from the vehicle 1; 2.

According to yet another peculiarity of the present invention, the recess 17 includes, in its lower portion 30, more particularly at the level of the support base 25, an opening 31 for the passing through and the support, by adapted lifting means 32, of a battery module 22, in order to extract the latter laterally from the chassis 4, through the opening 24 laterally to this recess 17. The lifting means 32 may be in the form of a fork of a pallet lifter. The battery module 22 has advantageously indentations 33 at the level of its lower face 34 adapted for receiving and accommodating the branches of such a fork.

Thus, the procedure for removing a battery module 22 from a vehicle 1; 2 consists:

in having access to the interconnection means 23 by opening the access shutter 28 actuating the electrical safety cut-off means 27, in disconnecting the battery module 22 from the vehicle 1; 2 through said interconnection means 23, in seizing the battery module through the lifting forks of a pallet lifter, in slightly lifting this battery module to pass the eventual abutment flanges 26, in extracting the battery module 22 laterally.

Obviously, the installation of such a battery module 22 on a vehicle 1; 2 is performed in the same way by carrying out the steps in reverse order.

According to a particular embodiment, the vehicle 1; 2 also includes at least a second recess 17a extending, like the previous one 17, from at least one of the lateral sides 18, 19, of the chassis 4 under the plane 20 of the loading platform 10.

Thus, this recess 17A can be located on the same lateral side or on the opposite lateral side of this chassis 4.

Such a recess 17A includes at least insertion and support means 21 identical to those of the recess 17. It can also be equipped with interconnection means 23 for a module 35A as another battery module 22, even for an accessory module 35.

This can consist, for example, of an air-conditioning unit defined to counteract the adverse effects of extreme weather conditions in which these vehicles 1; 2 may operate.

For example, such an air-conditioning unit can ensure the cooling of the battery module or modules 22, even of the electric motor means, if necessary. Conversely, they can heat up one and/or the other if the vehicles are used in very cold weather.

As understood by the description above, this at least one second recess 17a may be without any interconnection means 23 for receiving an accessory module 35 in the form of a simple tool storage box or the like.

Irrespective of the kind of accessory module 35, the latter preferably meets the same features as a battery module in that it can advantageously include, at the level of its lower face 34, indentations 33 for receiving such an accessory module 35 by means of lifting means 32 such as a pallet lifter or the like.

I claim:

1. A vehicle for container transport comprising:
   rolling means; and
   a chassis being mounted on top of said rolling means, having lateral sides, and being comprised of at least one accommodation extending from at least one lateral side of said lateral sides so as to form a recess having an upper recess portion having an upper opening, a lower recess portion being opposite said upper recess portion, and a side recess portion being between said upper recess portion and said lower recess portion and having a side opening;
   a battery being mounted in said recess so as to provide a self-contained electrical energy supply to an electric motor means connected to said rolling means for driving said rolling means and being comprised of at least one battery module,
   wherein said at least one accommodation is comprised of means for lateral insertion and support of said at least one battery module; and
   means for electrical interconnection with said at least one battery module within said recess,
   wherein said means for lateral insertion and support of said at least one battery module is comprised of said side opening and a support base in said lower recess portion, said at least one battery module resting on said support base, wherein said support base is comprised of abutment flanges having a lower portion permanently extending from a periphery of said lower recess portion of said recess and inside said lower recess portion of said recess and a side portion permanently extending from a periphery of said side recess portion of said recess and inside said side recess portion of said recess so as to ensure transverse and longitudinal immobilization of said at least one battery module, and wherein said support base forms a bottom opening in said recess so as to pass a lifting means to said least one battery module through said bottom opening around said lower portion of said abutment flanges concurrent with said transverse and longitudinal immobilization on said lower recess portion of said at least one battery module by said side portion, said lifting means able to lift and pass said at least one battery module through said side opening over said side portion of said abutment flanges and through said upper opening.

2. The vehicle for container transport, according to claim 1, further comprising: an electrical safety cut-off means within said recess so as to cut-off said self-contained electrical energy supply disconnecting said at least one battery module from the means for electrical interconnection.

3. The vehicle for container transport, according to claim 2, wherein said electrical safety cut-off means comprises an access shutter in communication with said means for electrical interconnection with said at least one battery module, wherein said at least one battery module is comprised of an electrical battery cut-off means between said at least one battery module and said means for electrical interconnection with said at least one battery module, and wherein said access shutter is cooperative with said electrical battery cut-off means so as to have an open position corresponding to activating said electrical battery cut-off means.

4. The vehicle for container transport, according to claim 1, wherein said bottom opening is smaller than said side opening so as to pass said at least one battery module through said recess and over said abutment flanges with the lifting means.

5. The vehicle for container transport, according to claim 1, wherein said at least one battery module is comprised of a lower battery module face with a plurality of indentations so as to be configured to receive and accommodate the lifting means.

6. The vehicle for container transport, according to claim 1, wherein said chassis is comprised of said at least one accommodation so as to form said recess and a second recess, said recess extending from said at least one lateral side of said lateral sides, said second recess extending from another lateral side of said lateral sides.

7. The vehicle for container transport, according to claim 6, further comprising: a module removably mounted within said second recess, said module being comprised of at least one of a group consisting of another battery module and an accessory module.

* * * * *